United States Patent
Kaeb et al.

(10) Patent No.: US 8,985,931 B2
(45) Date of Patent: Mar. 24, 2015

(54) HORIZONTAL ROTATING DRUM WITH ELEVATED DISCHARGE

(71) Applicant: KSi Conveyors, Inc., Cissna Park, IL (US)

(72) Inventors: Terry N Kaeb, Hoopeston, IL (US); Todd William Kaeb, Cissna Park, IL (US); Paul Arthur Kaeb, Sabetha, KS (US)

(73) Assignee: KSi Conveyors, Inc., Sabetha, KS (US)

( * ) Notice: Subject to any disclaimer, the term of this patent is extended or adjusted under 35 U.S.C. 154(b) by 102 days.

(21) Appl. No.: 13/689,258

(22) Filed: Nov. 29, 2012

(65) Prior Publication Data

US 2013/0330155 A1    Dec. 12, 2013

Related U.S. Application Data

(60) Provisional application No. 61/633,331, filed on Feb. 8, 2012.

(51) Int. Cl.
    *A01C 1/00*    (2006.01)

(52) U.S. Cl.
    CPC .......................................... *A01C 1/00* (2013.01)
    USPC ...... 414/287; 414/403; 414/810; 414/222.01; 414/808; 222/197; 222/240; 222/367; 222/370; 366/135; 366/228

(58) Field of Classification Search
    USPC ............ 414/332, 403, 810, 222.01, 287, 288, 414/299, 300, 301, 304; 222/197, 196, 216, 222/217, 240, 411, 367, 370; 366/225, 226, 366/227, 228, 229
    See application file for complete search history.

(56) References Cited

U.S. PATENT DOCUMENTS

| | | | | |
|---|---|---|---|---|
| 3,135,668 A | * | 6/1964 | Wesson | 435/291.8 |
| 3,161,403 A | * | 12/1964 | Lincoln et al. | 366/227 |
| 4,175,335 A | * | 11/1979 | Avril | 34/128 |
| 4,326,809 A | * | 4/1982 | Mendehall | 366/4 |
| 4,423,961 A | * | 1/1984 | Steiner | 366/183.4 |
| 4,543,180 A | * | 9/1985 | Riker | 209/44 |
| 4,664,527 A | * | 5/1987 | Schuler | 366/141 |
| 5,033,863 A | * | 7/1991 | Linkletter | 366/228 |
| 5,076,704 A | * | 12/1991 | Serbousek | 366/141 |
| 5,082,553 A | * | 1/1992 | Tanii | 209/3 |
| 5,300,438 A | * | 4/1994 | Augspurger et al. | 435/290.3 |
| 5,341,729 A | | 8/1994 | Zittel | |
| 5,380,085 A | * | 1/1995 | Milek | 366/44 |
| 5,427,449 A | * | 6/1995 | Christenson et al. | 366/59 |
| 5,429,434 A | * | 7/1995 | Milek | 366/57 |
| 6,149,291 A | | 11/2000 | Christenson | |
| 2011/0027479 A1 | | 2/2011 | Reineccius | |

OTHER PUBLICATIONS

Author: Valmetal Inc Title: Tumbler / Mixer Printed in Canada 2005, EM Communications Inc.

* cited by examiner

*Primary Examiner* — Kaitlin Joerger
(74) *Attorney, Agent, or Firm* — Daniel J Coughlin

(57) ABSTRACT

A rotating drum with elevated discharge chute to lower the height requirement of a stacked seed treatment system. The height requirement of stacked seed treatment systems can be lowered by elevated the discharge point of the treated seed without requiring additional expense transfer components. The elevated discharge drum incorporates a series of lifting flights at the discharge end of the drum. These flights elevate the seed onto a discharge chute, which facilitates transfer to the discharge conveyor.

12 Claims, 4 Drawing Sheets

HORIZONTAL ROTATING DRUM WITH ELEVATED DISCHARGE

FIELD

The present invention is in the technical field of treating seeds in a stacked seed treatment system.

BACKGROUND

Seeds planted for agricultural and other purposes are often treated with insecticides, nematicides, fungicides, inoculants, micronutrients and/or other compositions prior to planting. Treatment may accomplish various purposes including inhibiting the growth of insects, bacteria, molds, fungus, and parasites that are destructive to the seed and plant growth. Seed treatments are commonly applied by spraying a liquid composition to the surface of seed. Direct application of the seed treatment fluid to the seed before planting requires a smaller quantity of seed treatment composition than the traditional field application of treatment fluids.

Treatment system components are commonly stacked vertically, allowing for the gravimetric flow of seed between components. First, seed is delivered to a weighing or staging hopper positioned at the top of the treatment system. Seed then flows downward into a seed wheel or other metering system that regulates the flow of untreated seed into the treatment chamber. In the treatment chamber, airborne droplets of treatment fluid are applied to the seed surface. The seed exits the treatment chamber into a horizontal rotating drum with hollow ends for receiving and discharging seed. A discharge conveyor or auger then receives the discharged seed. The conveyor, bucket elevator, or auger transfers the treated seed to the subsequent storage or transport vessel.

The vertical stacking requires the first component, the weigh hopper, to be raised high in the air on a large frame. Likewise, the treater chamber is elevated above the rotating drum, which requires the electronic and fluid controls to be extended to the elevated position. The horizontal drum is also mounted to an elevated frame, the legs of the frame are commonly 24 to 36 inches tall, in order to discharge seed into the discharge conveyor.

The rotating drum mixes the treated seed, evenly distributes the treatment coat, and allows the treatment solution to dry. The interior of the rotating drum is lined with a series of lifting flights for mixing the treated seed and propelling the seed towards the discharge end of the drum. The flights pass through the aggregate of treated seed in the bottom of the drum causing the seed to be lifted up the side of the drum, creating a continuous cascade of seed that mixes and evenly distributes treatment across the surface of the individual seeds. At the discharge end of the rotating drum, the flighting pushes the aggregate out the bottom of the open discharge end of the rotating drum.

A significant problem with the height of stacked treatment systems is that since they are very tall, on the order of 21 feet or more in height, the systems rarely fit in existing buildings. Given that ordinary buildings do not have this clearance height, it is necessary to custom design a custom facilities to house the seed treating assembly, or to incur the costs to modify existing building to accommodate the treating assembly. Several existing technologies have been introduced to attempt to lower individual components within the stacked seed treater systems, including low-profile hopper assemblies, such as U.S. Pat. No. 8,177,095 to Jim Renyer et al., and low-profile discharge conveyors and bucket elevators. However, even with the added cost and complexity of these existing solutions, the stacked treater system remains excessively tall.

SUMMARY

In accordance with the invention, the clearance height requirement of stacked treater systems is reduced by incorporating a series of lifting discharge flights that lift seed onto an elevated discharge chute at the end of the rotating drum. For example, some advantages of the present invention include an apparatus which provides:

a. a series of rotating lifting flights, paddles, scoops, buckets, or other lifting apparatus that elevates and deposits the material onto a discharge chute;

b. a discharge chute that is partially inserted into an opening in the discharge end of the horizontal rotating drum that facilitates, either actively or passively, the discharge of the seeds from within the rotating cylinder;

c. an elevated discharge point, so that the horizontal rotating drum is capable of discharging seed to the discharge conveyor or auger without raising the drum on an elevated frame, thus resulting in lower clearance height requirement for the entire stacked seed treater system;

d. a rotating drum for mixing and drying treated seed with a discharge point that is higher than the inlet point; and e. lifting flights that can elevate the material onto a discharge chute while the drum is rotating in either direction.

Discharging seed from an elevated chute provides a higher seed transfer point from the drum to the discharge conveyor or auger. This results in a lower height requirement for the upstream seed treating components. In stacked seed treatment systems, seed descends gravimetrically from a seed treater into the rotating drum, where it is mixed and dried. It is common to use of a series of longitudinal flights mounted on the interior surface of the drum to partially lift the material to establish a mixing cascading action at the side of the drum. This cascade of treated seeds facilitates mixing and drying. The seed is then discharged over the bottom of the opening in the discharge end of the drum. In accordance with the invention, however, a series of discharge lifting flights positioned at the discharge end of the drum can collect a portion of the material from the bottom of the rotating drum, elevating and depositing the material onto a discharge chute. The discharge chute is partially inserted into the open discharge end of the rotating drum in order to receive the seed. The seed can then descend from the elevated discharge chute into a discharge conveyor or auger.

The clearance height requirement of the stacked treatment system can be lowered by discharging seed from the rotating drum at an elevated discharge point. Existing drums are positioned on elevated frames in order to provide clearance for the discharge conveyor. By elevating the seed with a series of discharge lifting flights, the rotating drum can be lowered at or near ground level, or even below ground, and still discharge seed into a discharge conveyor. This reduces the height requirement of the upstream components of the stacked treatment system. Where previous systems relied on gravity to transfer seed from one component to the other, an advantage to an elevated discharge is that the discharge point of the seed can be higher than the inlet point without adding to the cost or complexity of existing treatment components.

BRIEF DESCRIPTION OF DRAWINGS

Aspects are illustrated by way of example, and not by way of limitation, in the accompanying drawings, wherein.

DETAILED DESCRIPTION

Figure 1:
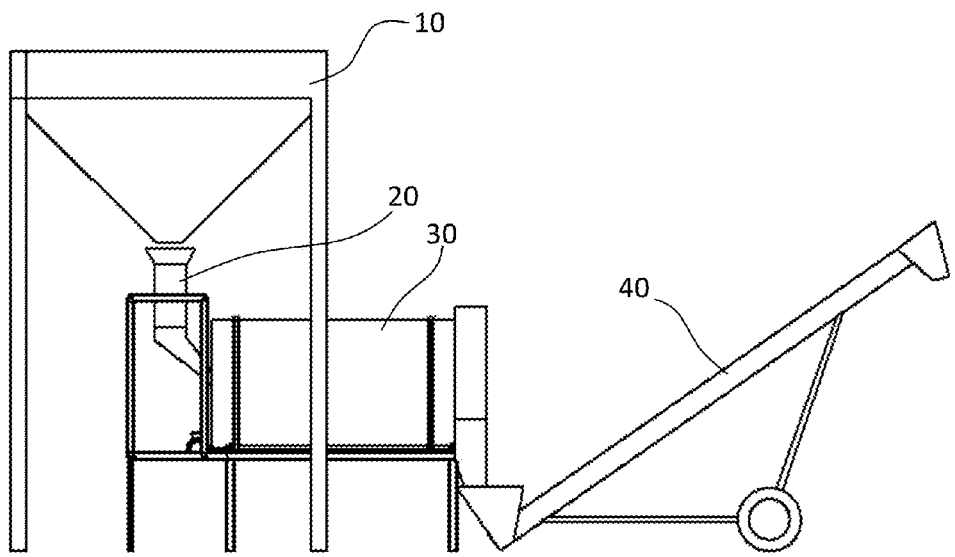
FIG. 1 is a side view of existing stacked seed treatment systems with a bottom discharge rotating drum.

Referring now to the invention in more detail, in FIG. 1 there is shown a typical arrangement of existing stacked treater system, including a weigh hopper 10, a treater chamber 20, a rotating drum 30, and a discharge conveyor 40. Seed descends gravimetrically from the weigh hopper 10 to each subsequent component. This requires that the components are stacked vertically. The vertically stacked components require an excessively tall clearance height.

Figure 2:
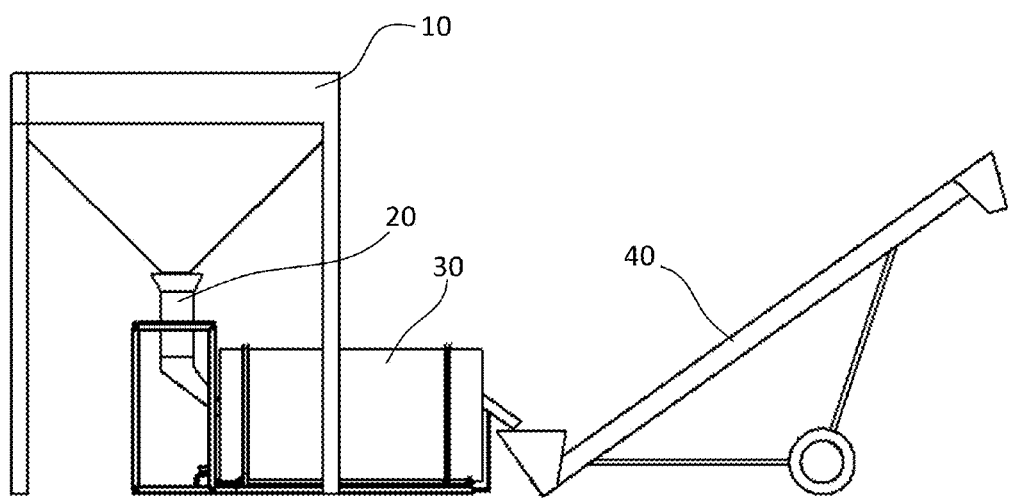
FIG. 2 is a side view of the stacked seed treatment systems with an elevated discharge drum.

In FIG. 2 there is shown the stacked treater system utilizing a rotating drum 30 with elevated discharge. In comparison with FIG. 1, the weight hopper 10, the treater chamber 20, and the rotating drum 30 are lowered, while still discharging into the discharge conveyor 40. Seed descends gravimetrically from the weigh hopper 10 through the treatment chamber 20 and into the rotating drum 30. The rotating drum lifts the seed, as described below, into the discharge conveyor 40.

Figure 3:
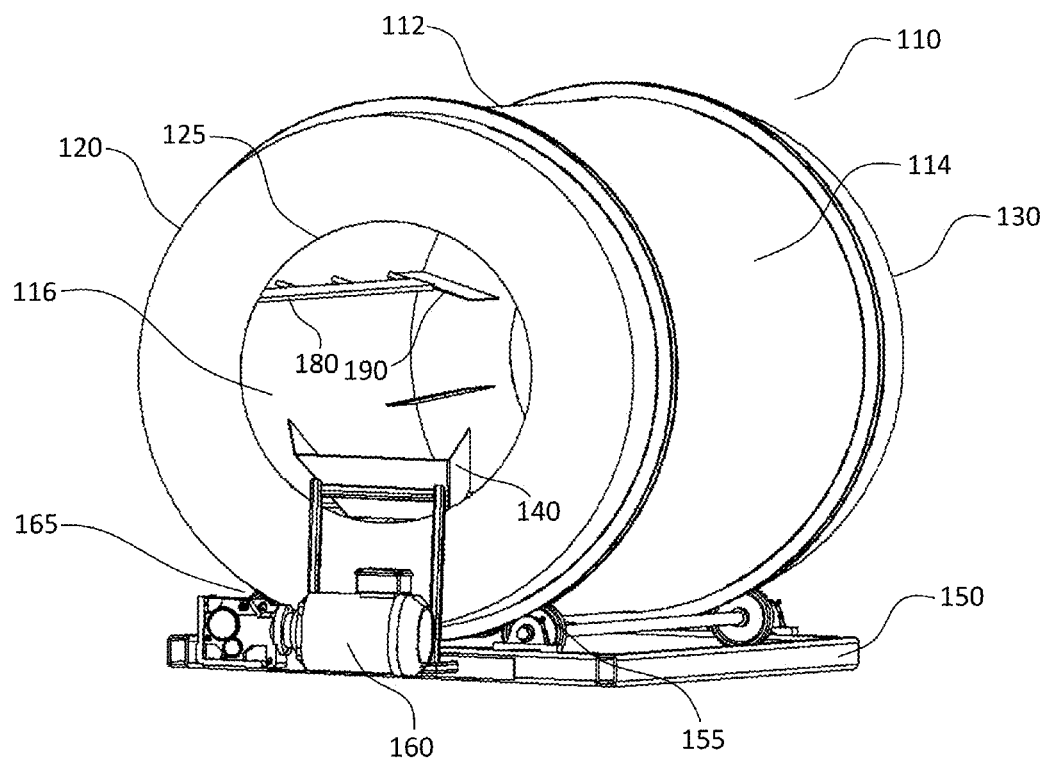
FIG. 3 is a perspective view of the inlet end of the elevated discharge drum.

In FIG. 3 there is shown the inlet end of the horizontal rotating drum 110 that can be used to decrease the overall height of the stacked treatment system. The drum 110 has a cylindrical wall 112, an inlet end 120, and a discharge end 130. The horizontal rotating drum 110 also has an exterior surface 114 and an interior surface 116. The inlet end 120 has an inlet opening 125. An inlet chute 140 is partially inserted within the inlet opening 125 for receiving seed into the drum. The drum 110 is mounted on a frame 150 with a plurality of rollers 155. A motor 160 drives the drive roller 165, which causes the drum to rotate about a central axis 167.

The inlet end 120 of the drum 110 receives seed from the treatment chamber 20 positioned above the drum. Seed is then mixed and dried within the drum 110. A plurality of longitudinally extending flights 180 are mounted to the inside surface of the wall of the drum. The rotation of the drum causes these longitudinal flights 180 to lift seed up the side of the drum 110, causing the aggregate to cascade along the side of the drum 110, thus mixing the treated seed. The longitudinal flights 180 can also be positioned at an angle or curve relative to the longitudinal axis of the drum. When the longitudinal flights are angled, the direction of drum rotation changes how the longitudinal flights affect the seed. The longitudinal flights can be angled such that rotation in one direction causes the seed to be primarily retained, such that the leading edge of the longitudinal flight 180 engages the seed toward the discharge end 130 of the drum. When rotated in the opposite direction, the leading edge of the longitudinal flight 180 engages the seed first toward the inlet end 120 of the drum and causes the seed to be propelled toward the discharge end 130.

Figure 4:
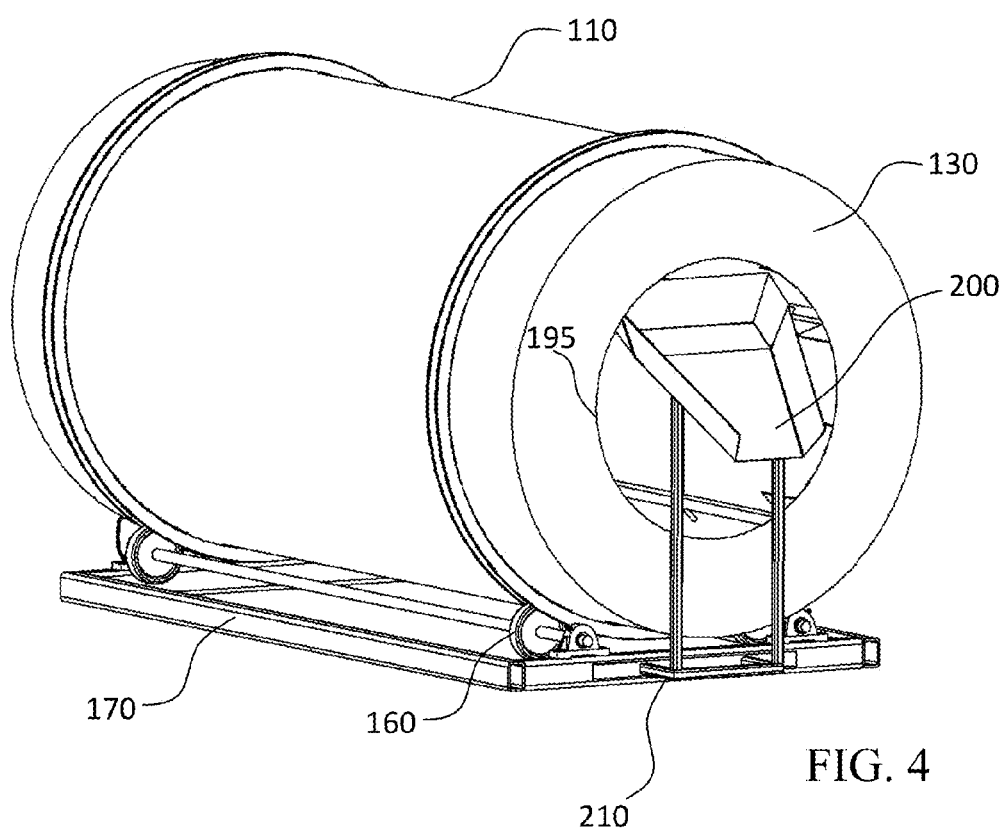
FIG. 4 is a perspective view of the discharge end of the elevated discharge drum.

In FIG. 4 there is shown the elevated discharge end 130 of the drum 110. The discharge end 130 has a discharge opening 195. A discharge chute 200 is partially inserted within the discharge opening 195 for discharging seed. The discharge chute 200 is mounted to the frame 170 by a bracket 210.

Figure 5:
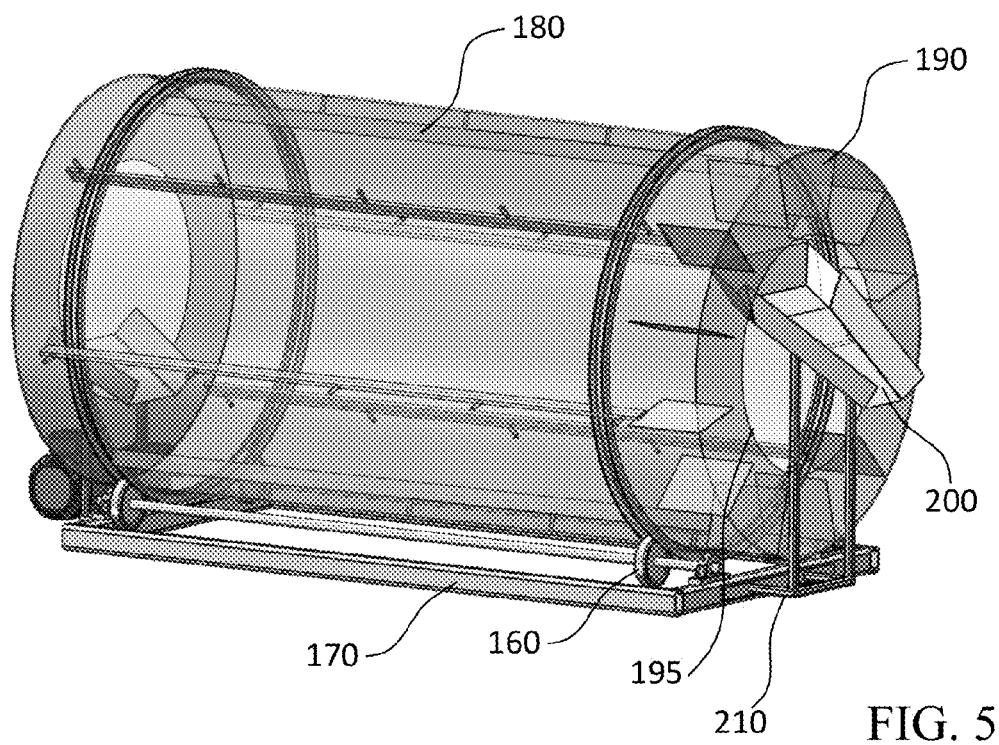
FIG. 5 is a perspective view of the interior of the elevated discharge drum with the cylindrical and end walls transparent, showing the longitudinal flights and discharge flights on the interior of the cylindrical wall.

In FIG. 5 there is shown the drum 110 with transparent cylindrical wall 112 and transparent inlet end 120 and discharge end 130 to better illustrate the interior of the drum. A plurality of discharge lifting flights 190 are mounted to the inside surface of the drum wall near the discharge end.

The discharge lifting flights 190 are equally spaced about the entire circumference of the inside surface of the cylindrical wall 112. The discharge lifting flights 190 extend approximately perpendicularly from the interior surface 116 of the drum 110. This allows the discharge lifting flights 90 to elevate seed independent of the rotation direction. Either the longitudinal flights 180 or a slight incline of the inlet end 120 of the drum propel the seed toward the discharge end 130 of the drum. The discharge end wall 130 retains the seeds, causing the seed to accumulate at the discharge end of the drum. Once accumulated at the discharge end, the seed is engaged by the discharge lifting flights 190.

The discharge lifting flights 190 move through and engage a portion of the aggregated seed. The rotation of the discharge lifting flights 190 causes the seed to be lifted. As the drum rotates, the discharge lifting flights support the seed, elevating and lifting the seed onto the discharge chute 200.

The discharge chute 200 is partially inserted into the discharge opening 195. Preferably, the discharge chute 200 is inserted into the drum 110 as far as the discharge lifting flights extend into the drum. The discharge chute 200 is positioned at an incline so that as the seed descends from the discharge lifting flights 190, the seed is transferred to the discharge conveyor 40. The elevation of the discharge chute eliminates the need to elevate the horizontal rotating drum on a raised frame, while still allowing the drum to discharge into a conveyor hopper. The drum 110 is mounted on a frame 150 that positions that drum at or near the floor level. The frame 150 may have be positioned directly on the ground, as herein illustrated, or may have fixed or adjustable legs. Adjustable legs would be used to determine the angle, or pitch, of the horizontal drum.

In one specific embodiment, the point where the seed is discharged from discharge end 130 is higher than the point where the seed is received into the inlet end 120. In another embodiment, the seed inlet point is equal to or above the discharge point. This embodiment maintains several of the above described advantages by discharging at an elevation higher than the bottom of the opening of the drum and allowing the stacked seed treater system to be lowered since the drum does not require elevation on a raised frame.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

What is claimed is:

1. An apparatus for decreasing the clearance height requirement of a stacked treater system, the apparatus comprising:
   a. a horizontal rotating drum that mixes and dries treated seed with an inlet end and a discharge end;
   b. the horizontal rotating drum has an inlet opening in the inlet end for receiving seed from an inlet chute;
   c. the horizontal rotating drum has a discharge opening in the discharge end;
   d. a discharge chute disposed within the discharge opening;
   e. a series of lifting flights disposed at the discharge end of the horizontal rotating drum that elevates the dried seed into the discharge chute and are capable of lifting the dried seed while the horizontal rotating drum rotates in either direction; and f. the discharge chute discharges dried seed from the horizontal rotating drum at a higher point than the inlet chute receives seed into the horizontal rotating drum.

2. The apparatus of claim 1, wherein the horizontal rotating drum is disposed on a frame that is raised less than 18" above the floor.

3. The apparatus of claim 1, wherein the discharge chute is attached to a frame so that the discharge chute remains stationary independent of the rotation of the horizontal rotating drum.

4. An apparatus for transferring seed from a horizontal rotating drum to a discharge conveyor, the apparatus comprising:

a. a horizontal rotating drum that mixes and dries treated seed with a discharge end;

b. the horizontal rotating drum has an inlet opening in the inlet end for receiving seed from an inlet chute;

c. the horizontal rotating drum having a discharge opening in the discharge end;

d. one or more lifting flights capable of lifting the dried seed while rotating in either direction and disposed at the discharge end of the horizontal rotating drum;

e. a discharge chute that is disposed within the discharge opening; and f. the series of lifting flights elevate the dried seed onto the discharge chute.

5. The apparatus of claim 4, wherein the horizontal rotating drum is disposed on a frame that is raised less than 18" above the floor.

6. The apparatus of claim 4, wherein the discharge chute is attached to a frame so that the discharge chute remains stationary independent of the rotation of the horizontal rotating drum.

7. The apparatus of claim 4, wherein the discharge chute discharges the dried seed from the horizontal rotating drum at a higher point than the inlet chute receives seed into the horizontal rotating drum.

8. A method for decreasing the clearance height requirement of a stacked treater system, the method comprising:

a. positioning a horizontal rotating drum on a frame, where the horizontal rotating drum has an inlet end and a discharge end;

b. receiving treated seed into the inlet end of the horizontal rotating drum;

c. drying the treated seed in the horizontal rotating drum;

d. rotating a series of lifting flights that are disposed at the discharge end of the horizontal rotating drum;

e. elevating the dried seed onto a discharge chute with the series of lifting flights; and f. discharging the dried seed through a discharge opening in the discharge end for discharging seed.

9. The method of claim 8, wherein the series of lifting flights are capable of elevating the dried seed while rotating in either direction.

10. The method of claim 8, wherein the step of discharging the dried seed occurs at a higher point than the step of receiving the seed.

11. The method of claim 8, wherein the step of positioning the horizontal rotating drum further comprises positioning the inlet end of the drum at an incline relative to the discharge end.

12. The method of claim 11, wherein the series of lifting flights is capable of elevating the dried seed while rotating in either direction.

* * * * *